(12) United States Patent
Hodel et al.

(10) Patent No.: US 10,890,499 B2
(45) Date of Patent: Jan. 12, 2021

(54) SYSTEM AND METHOD FOR PREDICTING STRAIN POWER SPECTRAL DENSITIES OF LIGHT MACHINE STRUCTURE

(71) Applicant: Caterpillar Inc., Peoria, IL (US)

(72) Inventors: Benjamin John Hodel, Dunlap, IL (US); David Andres Villero, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 401 days.

(21) Appl. No.: 15/850,217

(22) Filed: Dec. 21, 2017

(65) Prior Publication Data

US 2019/0195712 A1 Jun. 27, 2019

(51) Int. Cl.
*G01L 5/00* (2006.01)
*G01P 15/08* (2006.01)
*G01M 7/02* (2006.01)

(52) U.S. Cl.
CPC ........... *G01L 5/0061* (2013.01); *G01M 7/025* (2013.01); *G01P 15/0802* (2013.01)

(58) Field of Classification Search
CPC .................................................. G01L 5/0061
See application file for complete search history.

(56) References Cited

U.S. PATENT DOCUMENTS

| 5,767,406 A | 6/1998 | Hu |
| 5,854,993 A | 12/1998 | Grichnik |
| 6,704,664 B2 | 3/2004 | Su et al. |
| 2006/0287972 A1* | 12/2006 | Kelso ................... G06F 11/3058 |
| 2013/0292144 A1* | 11/2013 | Zhu .......................... E02F 3/841 |
| | | 172/2 |

(Continued)

FOREIGN PATENT DOCUMENTS

| CN | 105651478 A | 6/2016 |
| GB | 2369209 A | 5/2002 |
| KR | 20170039906 A | 4/2017 |

OTHER PUBLICATIONS

Lee et al., "Structural Damage Detection by Power Spectral Density Estimation Using Output-Only Measurement," Hindawi Publishing Corporation (Year: 2016).*

(Continued)

*Primary Examiner* — Hyun D Park
(74) *Attorney, Agent, or Firm* — Harrity & Harrity LLP

(57) ABSTRACT

A machine includes a frame, an engine supported on the frame, ground-engaging elements supported on the frame and driven by the engine to propel the machine, a machine light structure supported on the frame, a multiple-axis accelerometer positioned to generate an acceleration signal relative to a base of the machine light structure, and a controller. The controller is programmed to receive the acceleration signal, partition the acceleration signal into overlapped window periods, transform the acceleration signal of each overlapped window period into a power spectral density, and pass the power spectral densities of each overlapped window period through a strain power spectral densities prediction model to generate predicted strain power spectral densities of the machine light structure. A health monitor receives the predicted strain power spectral densities and is configured to generate a notification responsive to the predicted strain power spectral densities.

20 Claims, 5 Drawing Sheets

(56) References Cited

U.S. PATENT DOCUMENTS

2016/0371957 A1 12/2016 Ghaffari et al.
2017/0320494 A1* 11/2017 Singh .................. B60C 23/0408

OTHER PUBLICATIONS

Determination of Stress Histories in Structures by National Input Modal Analysis, Henrik P. Hjelm, Rune Brincker, Kasper Munch.
Experimental Determination of Bending Strain Power Spectra from Vibration Measurements, Y.Yu and R.N. Miles.

* cited by examiner

SYSTEM AND METHOD FOR PREDICTING STRAIN POWER SPECTRAL DENSITIES OF LIGHT MACHINE STRUCTURE

TECHNICAL FIELD

The present disclosure relates generally to a system and method for predicting strain of light structures during machine operation and, more particularly, to using a strain power spectral densities prediction model to generate predicted strain power spectral densities of machine light structures.

BACKGROUND

It is desirable to know the amount of strain, or reliability damage, machine light structures experience during machine operation. Strain can be measured directly using wired or wireless strain gauges; however, strain gauges are expensive, brittle, and impractical to mount at various locations on each machine light structure of the machine. Further, various existing algorithms for light structure severity estimation, including, for example, power spectral density, fatigue damage spectrum, and Rupp damage spectrum, do not achieve adequate accuracy. The key challenge to inferring strain from other base motion sensors is that the outputs are not well-correlated to the base-motion inputs in time. A shock to the base motion results in a decaying vibrational response in the strains, which last much longer than the input. Also, certain motions can cause resonance vibrations due to the structural design of the light fabrication.

US Patent Application Publication No. 2016/0371957 to Ghaffari et al. discusses a system for monitoring physical and environmental conditions of an object. The system includes one or more sensing devices affixed or mounted to the object. The sensing devices produce sensor data (e.g., motion, vibration, impact, temperature, stress and strain) that can be used to anticipate failure or for operation and/or maintenance purposes. The sensing devices can be positioned on structures such as a building or an oil rig, on vehicles such as on airplanes, trains, ships and motor vehicles, and on moving devise such as wind turbines and draw bridges.

SUMMARY OF THE INVENTION

In one aspect, a machine includes a frame, an engine supported on the frame, ground-engaging elements supported on the frame and driven by the engine to propel the machine, a machine light structure supported on the frame, a multiple-axis accelerometer positioned to generate an acceleration signal relative to a base of the machine light, and a controller. The controller is programmed to receive the acceleration signal, partition the acceleration signal into overlapped window periods, transform the acceleration signal of each overlapped window period into a power spectral density, and pass the power spectral densities of each overlapped window period through a strain power spectral densities prediction model to generate predicted strain power spectral densities of the machine light structure. A health monitor receives the predicted strain power spectral densities and is configured to generate a notification responsive to the predicted strain power spectral densities In another aspect, a method of generating predicted strain power spectral densities of a machine light structure of a machine includes receiving an acceleration signal at a controller onboard the machine. The acceleration signal is received from a multiple-axis accelerometer positioned to generate the acceleration signal relative to a base of the machine light structure. The method also includes partitioning the acceleration signal into overlapped window periods, transforming the acceleration signal of each overlapped window period into a power spectral density, and passing the power spectral densities of each overlapped window period through a strain power spectral densities prediction model to generate predicted strain power spectral densities of the machine light structure. The method also includes generating a notification, by a health monitor, responsive to the predicted strain power spectral densities.

In yet another aspect, a control system for a machine includes a controller programmed to receive an acceleration signal at a controller onboard the machine, partition the acceleration signal into overlapped window periods. The controller is also programmed to transform the acceleration signal of each overlapped window period into a power spectral density, and pass the power spectral densities of each overlapped window period through a strain power spectral densities prediction model to generate predicted strain power spectral densities of the machine light structure. A health monitor receives the predicted strain power spectral densities and is configured to generate a notification responsive to the predicted strain power spectral densities Other features and aspects will be apparent from the following description and accompanying drawings.

DETAILED DESCRIPTION

Figure 1:
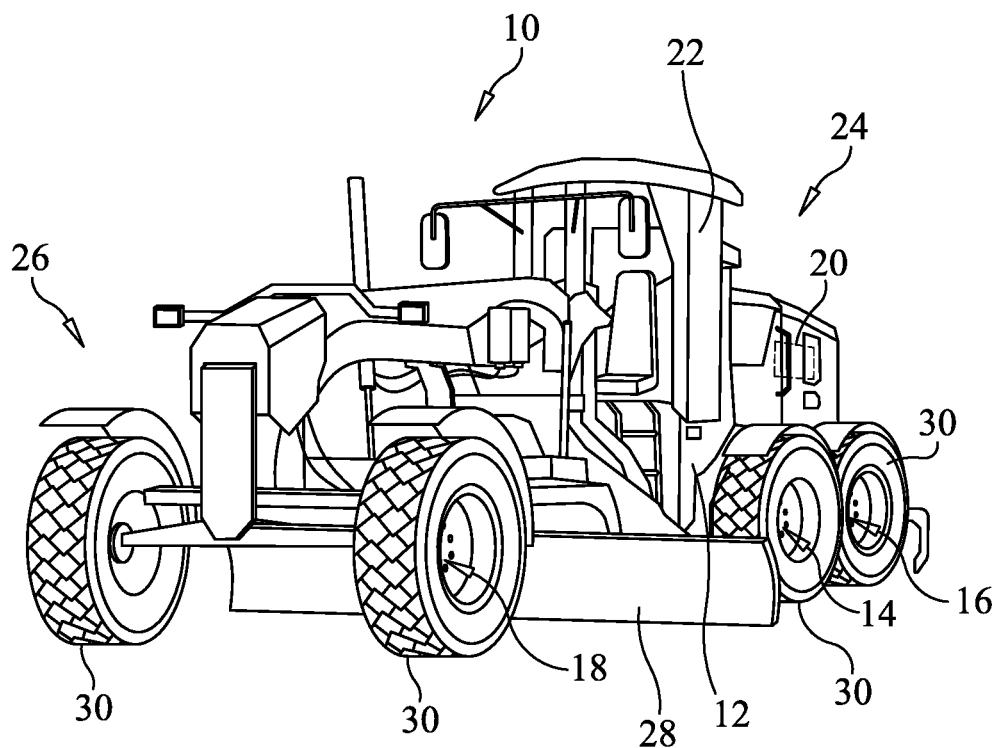
FIG. 1 is a side perspective view of an exemplary machine, according to the present disclosure.

Reference will now be made in detail to specific embodiments or features, examples of which are illustrated in the accompanying drawings. Wherever possible, corresponding or similar reference numerals will be used throughout the disclosure and accompanying drawings to refer to the same or corresponding parts.

An exemplary embodiment of a machine 10 is shown in FIG. 1. The machine 10 may be a motor grader, as shown, or any other off-highway machine or on-highway machine. The exemplary machine 10 may include a frame 12 supporting three axles 14, 16, and 18, with an engine 20 and operator control station 22 positioned above two of the axles 14, 16 at a rear end 24 of the machine 10. The third axle 18 may be positioned at a front end 26 of the machine 10, with an implement 28 or, more specifically, a blade, supported in between the rear axles 14, 16 and front axle 18. The engine 20 may power at least the implement 28 and ground-engaging elements 30, such as wheels, supported on opposing ends of each of the axles 14, 16, and 18.

Figure 2:
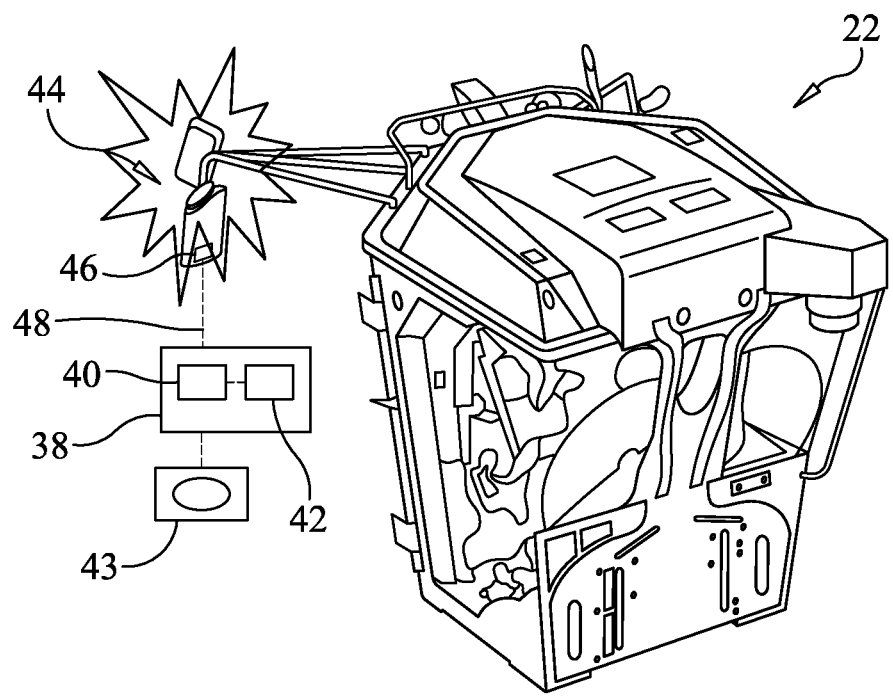
FIG. 2 is an exemplary operator control station of the machine of FIG. 1, including a machine light structure, according to one aspect of the present disclosure.

The operator control station 22 may house various actuators and controls for facilitating operator control of the machine 10. In particular, for example, an operator may manipulate one or more actuators to electronically control components such as the ground-engaging elements 30 and the implement 28 to perform work operations using the machine 10. Referring also to FIG. 2, a control system 38 for the machine 10 may include controller 40, which may receive signals from the actuators or controls, indicating desired control, and translate the signals into electronic commands for carrying out the desired control.

The controller 40 may include a processor and memory and may be configured to execute unique sets of instructions. The unique sets of instructions may be implemented as computer readable program code, stored in the memory, such that the controller 40 may be configured as a special purpose device. In particular, for example, hardware, software, and particular sets of instructions may transform the controller 40 into a device for carrying out the functionality discussed herein.

According to the present disclosure, the machine 10 may also include a health monitor 42, which may be part of the control system 38 of the machine 10 and may include or utilize the controller 40. The health monitor 42 may receive signals from various sensors and devices to determine, predict, or estimate the health of one or more components of the machine 10. That is, for example, the health monitor 42 may evaluate the health of various systems and components of the machine 10 and provide an indication of wear, strain, fatigue, or failure upon detection of the same.

According to the present disclosure, the health monitor 42 may generate or receive predicted power spectral densities, discussed in greater detail below, and generate a notification responsive to the predicted strain power spectral densities. The notification may be provided on a display 43 in the operator control station 22 and/or may be transmitted to a particular system or user, depending on user preferences.

The predicted strain power spectral densities may be generated for a light structure 44 of the machine. Light structures, referred to herein as light machine structures or machine light structures, may be defined as components that are primarily loaded by g-loading, vibration, or operator interaction. Light structures may typically include sheet metal enclosures, cabs, engine and cooling components, fenders, brackets, tanks, non-metallics, and the like. Whereas heavy structures may include the main structures responsible for carrying the primary operating loads of a machine. These structures are typically frames, axles, undercarriages, linkages and couplers. According to a particular example, the light structure 44 may include a mirror post, extending from the operator control station 22, as shown in FIG. 2.

According to the present disclosure, a multiple-axis accelerometer 46, such as a six-axis accelerometer or an accelerometer having a different number of axes, may be positioned to generate an acceleration signal 48 relative to a base of the machine light structure 44. As an alternative, several separate single-axis accelerometers distributed across or around the based on the machine light structure 44 may be used. The acceleration signal 48, which may be generated for forward/backward, up/down, left/right, pitch, yaw, and roll acceleration, may be received and processed by the controller 40. The controller 40 may be configured to provide predicted strain power spectral densities, such as to the health monitor 42, for the machine light structure 44 based on the acceleration signal 48. To do so, a strain power spectral densities prediction model may be used.

The strain power spectral densities model, which will be discussed in greater detail below, may be generated offboard the machine 10. For example, in a lab environment, the machine light structure 44, which may be a mirror post, may be mounted on a shake table. The machine light structure 44 may have a plurality of strain gauges, such as nine, mounted thereon, with the machine light structure 44 mounted on the shake table and moveable in six degrees of freedom, for example. Resulting shake table acceleration time history data and strain gage time history data may be used to build the strain power spectral densities model. According to alternative embodiments, the accelerations could be synthetic, like sine waves, or recorded data from actual machines in the field. It should be appreciated that a model may be created for each of the various machine light structures of the machine 10.

Figure 3:
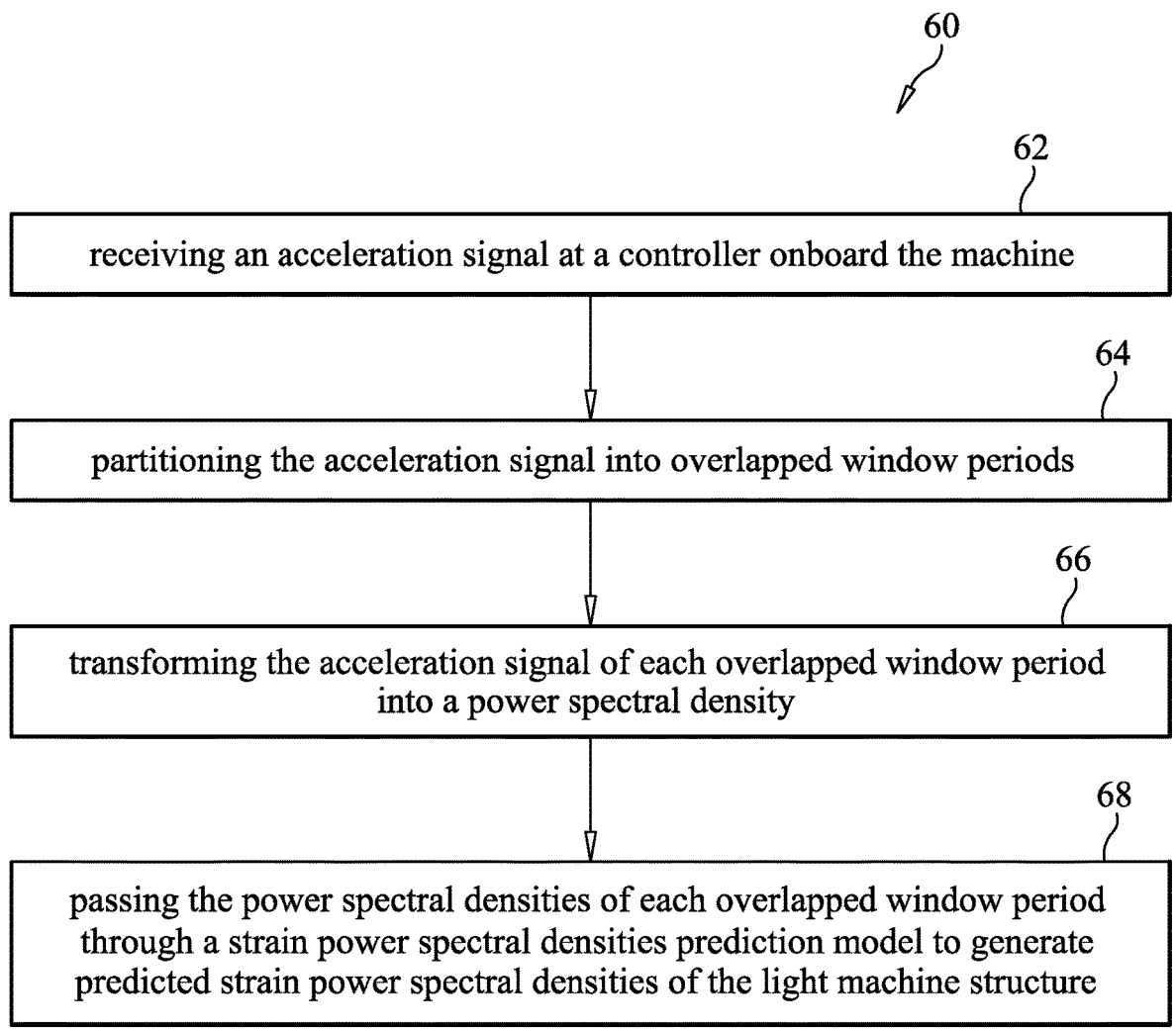
FIG. 3 is a flow diagram illustrating an exemplary method of generating predicted power strain spectral densities for the machine light structure of FIG. 2, according to the present disclosure.

Referring to FIG. 3, a flow diagram 60 illustrating an exemplary method of generating predicted strain power spectral densities of the machine light structure 44 on the machine 10 is shown. The method may be implemented in whole or in part by the control system 38 or, more specifically, the controller 40 and/or health monitor 42, and may run, or execute, continuously or intermittently. Since fatigue life is the reciprocal of damage divided by time, the method may only accumulate time when the machine 10 is non-idling or experiencing vibration. At a first step, at box 62, the acceleration signal 48 from the accelerometer 46 may be received at the controller 40 onboard the machine 10.

Figure 4:
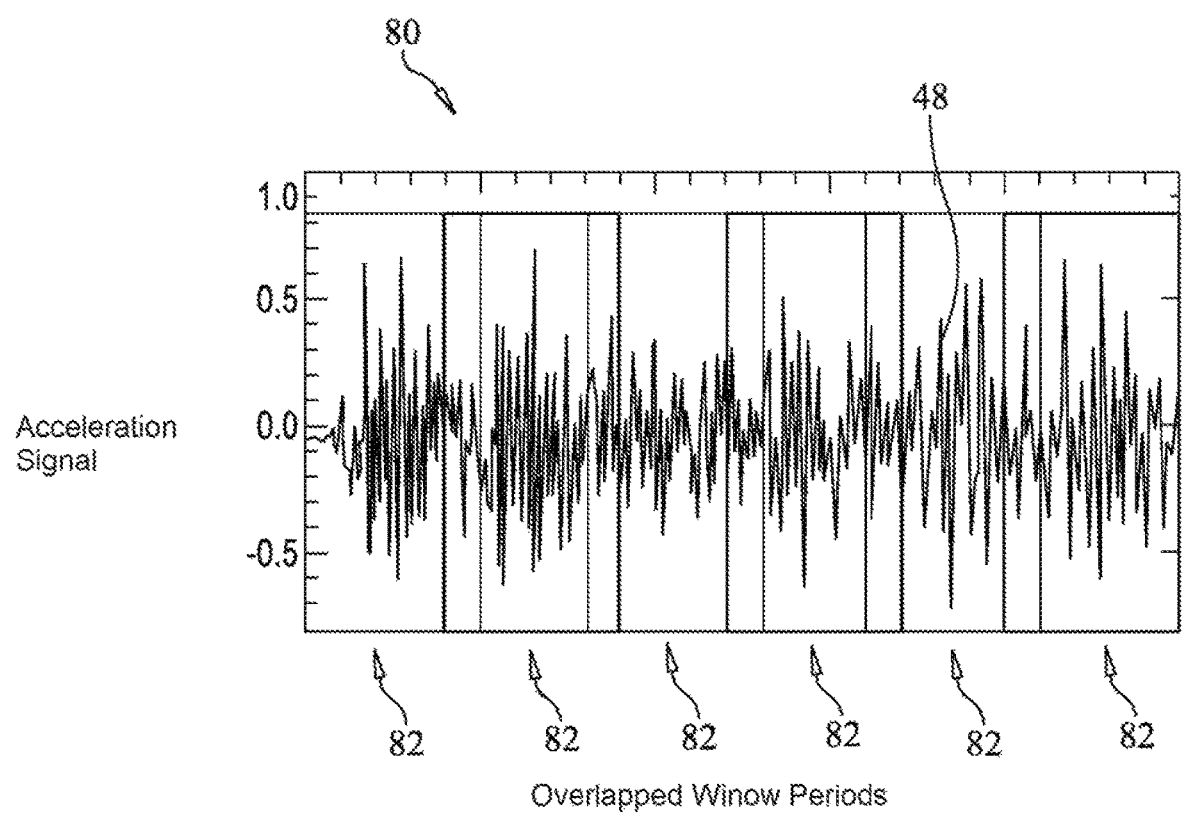
FIG. 4 is a graph illustrating the partitioning of an acceleration signal into overlapped window periods, according to one aspect of the present disclosure.
Figure 5:
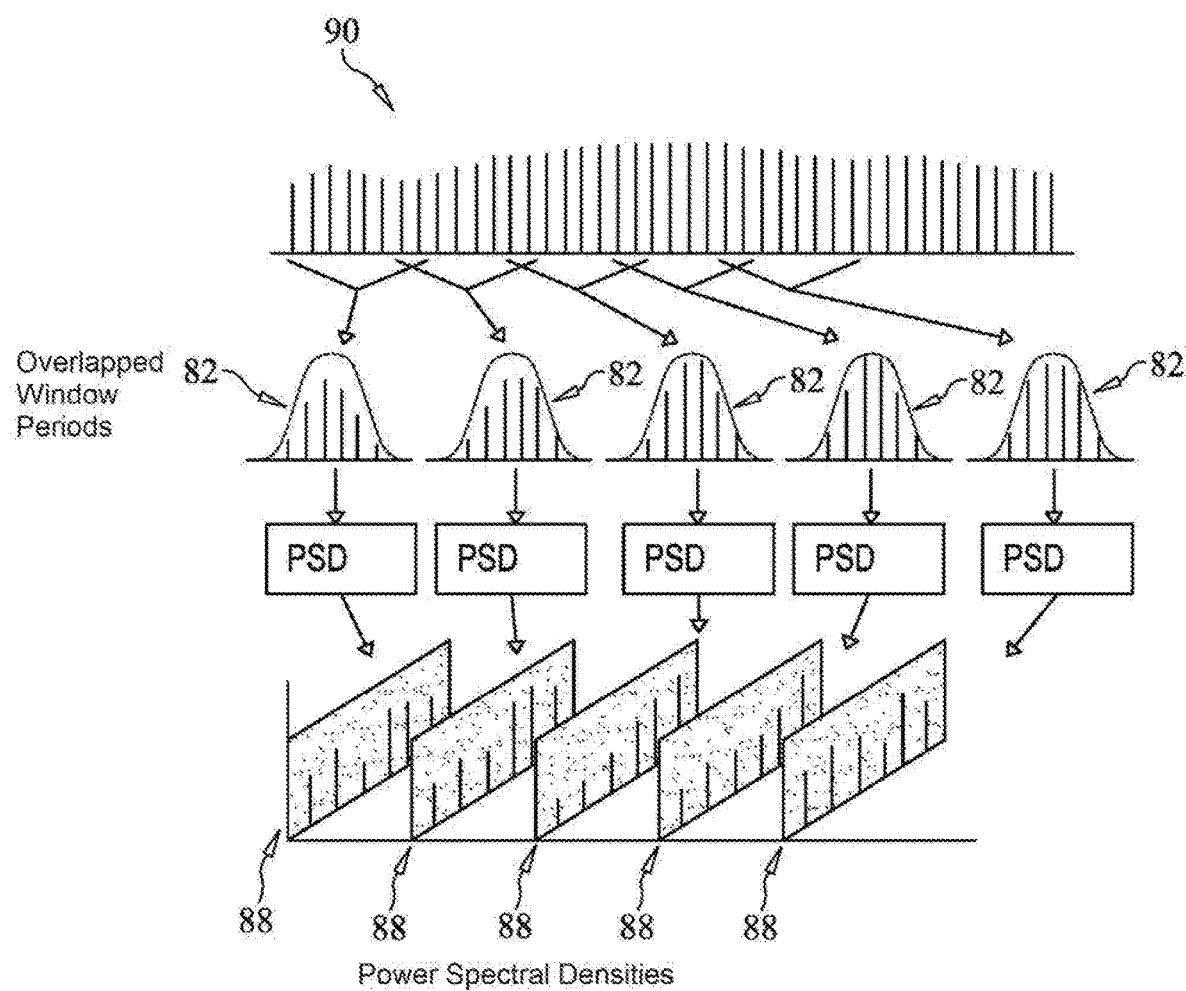
FIG. 5 is a diagram illustrating the transformation of the overlapped window periods into the frequency domain using a power spectral density computation, according to one aspect of the present disclosure.

At box 64, the acceleration signal 48 may be partitioned into overlapped window periods 82. As shown in a graph 80 of FIG. 4, one acceleration time series may be partitioned into overlapped window periods 82. At box 66, the acceleration signal 48 of each overlapped window period 82 may be transformed into a power spectral density 88, as shown in a diagram 90 of FIG. 5. In particular, for example, these overlapped window periods 82 may each be multiplied by a window function, such as a Hanning window, which may be used to reduce spectral leakage, and transformed into the frequency domain via a power spectral density computation. The controller 40 may also be programmed to retain only the power spectral densities 88 in a frequency of between about 0 hertz and 50 hertz.

At box 68, the power spectral densities 88 of each overlapped window period 82 may be passed through the strain power spectral densities prediction model, introduced above, to generate predicted strain power spectral densities of the machine light structure 44. That is, the power spectral densities 88 may be passed through the model to predict one of several corresponding, resulting strain power spectral densities. According to some examples, the number of strain cycles and their respective magnitudes may be more important than the magnitude alone. If the strain power spectral densities are outside or over a predetermined range, a notification may be provided using the health monitor 42.

Figure 6:
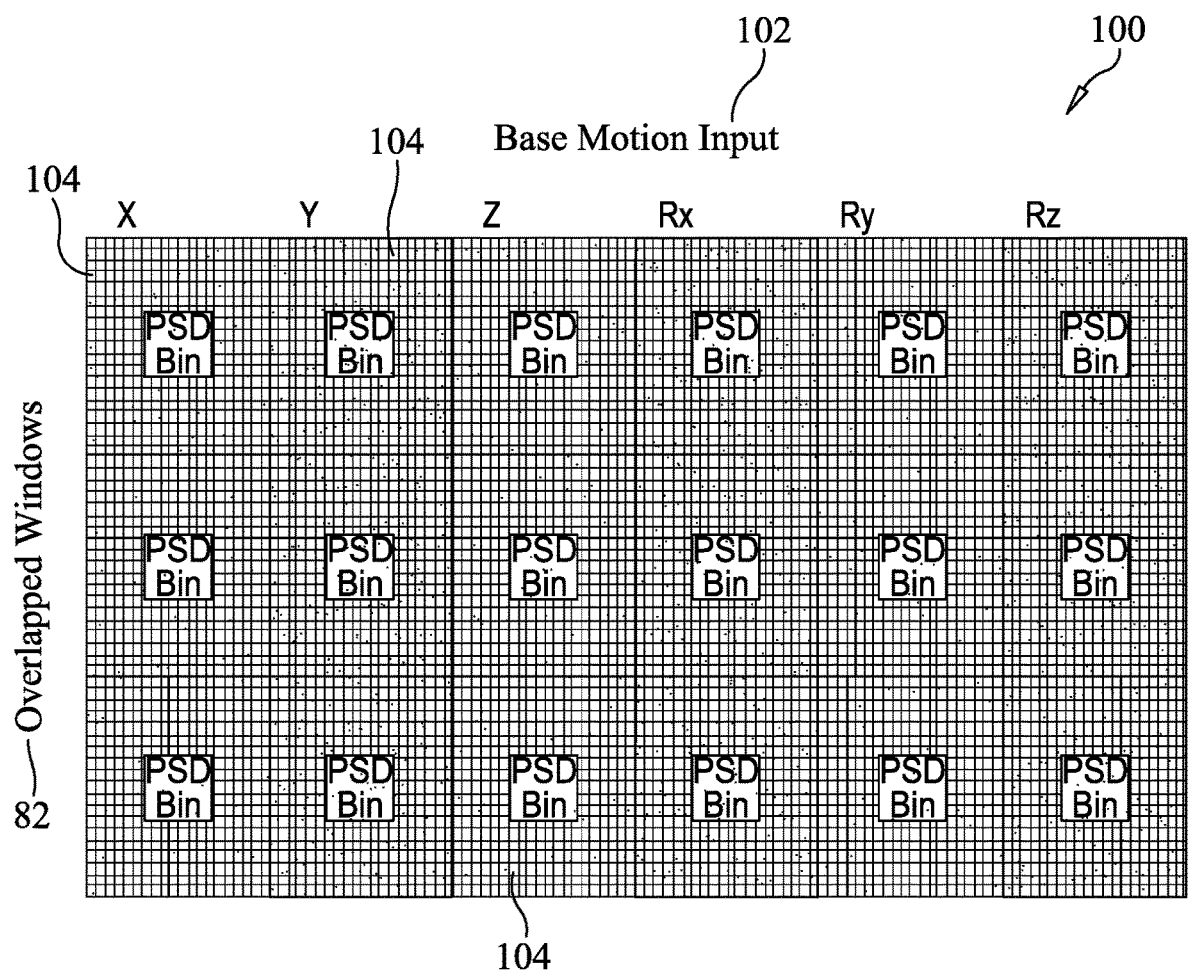
FIG. 6 is a graph depicting power spectral density bins for each base motion of input, according to one aspect of the present disclosure.

Turning now to a graph 100 in FIG. 6, the controller 40 may be programmed to partition the acceleration signal 48 into the overlapped window periods 82 (step 64 of FIG. 3), and transform the acceleration signal 48 of each overlapped window period 82 into the power spectral density 88 (step 66 of FIG. 3) for each base motion input 102 from the multiple-axis accelerometer 46. Each overlapped window period 82 for each base motion input 102 may represent a power spectral density 104 comprised of several bins, with each row of power spectral densities bins 104 defining an observation row. The observation rows may be applied to the strain power spectral densities prediction model to generate predicted strain power spectral densities for the machine light structure 44.

The shake table acceleration time history data may be processed using the same signal processing as the signals from the accelerometer 46. That is, the shake table acceleration time history data may be partitioned into overlapped window periods, such as the overlapped window periods 82 of FIG. 3, and transformed into power spectral densities, such as power spectral densities 88, for each overlapped window period. Mappings are created to the shake table acceleration time history data and the strain gauge time history data to generate the strain power spectral densities prediction model. According to a specific example, a random forest regression model may be used. To get an even sampling of the distribution of inputs and outputs, it may be desirable to use approximately at least a few thousand rows.

Overlapped windows may be optional. For example, overlapped windows may be used for model building; however, for model deployment (e.g., on-machine monitoring) overlapped windows may lead to double counting on accrued damage. If overlapped windows are used in deployment, the RMS average of the result may be used to get an average damage rate.

INDUSTRIAL APPLICABILITY

The system and method of the present disclosure are applicable to a wide variety of machines for predicting strain of machine systems and components. More particularly, the system and method are applicable to generating predicted strain power spectral densities of machine light structures of machines. Further, the present disclosure is applicable to using an accelerometer onboard the machine and a strain power spectral densities prediction model to predict strain power spectral densities of the machine light structures.

Referring generally to FIGS. 1-6, an exemplary machine 10 may be a motor grader, as shown, and may include a frame 12 supporting three axles 14, 16, and 18, with an engine 20 and operator control station 22 positioned above two of the axles 14, 16 at a rear end 24 of the machine 10. The third axle 18 is positioned at a front end 26 of the machine 10, with an implement 28 supported in between the rear axles 14, 16 and front axle 18. The engine 20 may power at least the implement 28 and ground-engaging elements 30 supported on the axles 14, 16, and 18.

The operator control station 22 may house various actuators and controls for facilitating operator control of the machine 10. In particular, for example, an operator may manipulate one or more actuators to electronically control components such as the ground-engaging elements 30 and the implement 28 to perform work operations. A control system 38 may include a controller 40, supported on the machine 10, which may receive signals from the actuators or controls, indicating desired control, and translate the signals into electronic commands for carrying out the desired control. The machine may also include a health monitor 42, which may be part of the control system 38 and may include or utilize the controller 40.

The machine 10 may include a plurality of machine light structures, such as, for example, a machine light structure 44 shown in FIG. 2, and it may be desirable to know the amount of strain, or reliability damage, of the machine light structure 44. To generate this information, a multiple-axis accelerometer 46 may be positioned to generate an acceleration signal 48 relative to a base of the machine light structure 44. The acceleration signal 48 may be received and processed by the controller 40, with the controller 40 being configured to provide predicted strain power spectral densities, such as to the health monitor 42, for the light machine structure machine structure 44 based on the acceleration signal 48.

In particular, the acceleration signal 48 may be received at the controller 40, at box 62 of FIG. 3. The acceleration signal 48 may then be partitioned into overlapped window periods 82, at box 64, with each overlapped window period 82 being transformed into a power spectral density 88, at box 66. At box 68, the power spectral densities 88 of each overlapped window period 82 may be passed through a strain power spectral densities prediction model to generate predicted strain power spectral densities of the machine light structure 44. If the strain power spectral densities are outside or over a predetermined range, a notification may be provided using the health monitor 42.

The strain power spectral densities prediction model may be generated offboard the machine 10. For example, in a lab environment, the machine light structure 44, which may be a mirror post, may be mounted on a shake table. The machine light structure 44 may have a plurality of strain gauges, such as nine, mounted thereon, with the machine light structure 44 mounted on the shake table and moveable in six degrees of freedom. Resulting shake table acceleration time history data and strain gage time history data may be used to build the strain power spectral densities model.

Particularly, the shake table acceleration time history data may be processed using the same signal processing as the accelerometer signals. That is, the shake table acceleration time history data may be partitioned into overlapped window periods 82, and transformed into power spectral densities for each of the overlapped window periods 82. The shake table acceleration time history data may be mapped to strain gauge time history data and may be fit into a model, such as, for example, a random forest regression model.

The system and method of the present disclosure provide a way to predict strain of machine light structures using on-machine measurements from an accelerometer and a model. As such, a plurality of costly strain gauges are not required for directly measuring strain of machine components. The predicted strain information is accurate and may be used to optimize the machine by adding strength to weak structures and/or reduce weight from over-designed structures. Further, the present system and method are based on insight that a suitable relationship exists between input and output of accelerations and strain in the frequency domain. In particular, light structures have modal responses, or strain movements, that are related by frequency to the based motion, or accelerations.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine, comprising:
   a frame;
   an engine supported on the frame;
   ground-engaging elements supported on the frame and driven by the engine to propel the machine;
   a machine light structure supported on the frame;
   a multiple-axis accelerometer positioned to generate an acceleration signal relative to a base of the machine light structure;

a controller to:
receive the acceleration signal;
partition the acceleration signal into overlapped window periods;
transform the acceleration signal of each overlapped window period into a respective power spectral density; and
pass the power spectral densities through a strain power spectral densities prediction model to generate predicted strain power spectral densities of the machine light structure,
wherein the strain power spectral densities prediction model includes a regression model;
a health monitor to:
receive the predicted strain power spectral densities; and
generate a notification responsive to the predicted strain power spectral densities,
wherein the predicted strain power spectral densities are used to optimize the machine by one or more of:
adding strength to the machine light structure, or
reducing weight from the machine light structure.

2. The machine of claim 1, wherein the strain power spectral densities prediction model is based on shake table acceleration time history data and strain gauge time history data.

3. The machine of claim 2, wherein the shake table acceleration time history data is partitioned into the overlapped window periods and each overlapped window period is transformed into the respective power spectral density.

4. The machine of claim 2,
wherein the shake table acceleration time history data and strain gauge time history data are fit into a random forest regression model, and
wherein the regression model is the random forest regression model.

5. The machine of claim 1, wherein the controller is further to:
apply a Hanning window to the overlapped window periods.

6. The machine of claim 5, wherein the controller is further to:
retain only the power spectral densities in a frequency range of between about 0 hertz and 50 hertz.

7. A method of generating predicted strain power spectral densities of a machine light structure of a machine, comprising:
identifying an acceleration signal generated relative to a base of the machine light structure;
partitioning the acceleration signal into overlapped window periods;
transforming the acceleration signal of each overlapped window period into a respective power spectral density;
passing the power spectral densities through a strain power spectral densities prediction model to generate predicted strain power spectral densities of the machine light structure,
wherein the strain power spectral densities prediction model includes a regression model; and
generating a notification, by a health monitor, responsive to the predicted strain power spectral densities,
wherein information based on the predicted strain power spectral densities is used to optimize the machine by one or more of:
adding strength to the machine light structure, or
reducing weight from the machine light structure.

8. The method of claim 7, wherein the strain power spectral densities prediction model is based on shake table acceleration time history data and strain gauge time history data.

9. The method of claim 8, further including:
partitioning the shake table acceleration time history data into the overlapped window periods.

10. The method of claim 8, further including:
fitting the shake table acceleration time history data and strain gauge time history data into a random forest regression model,
wherein the regression model is the random forest regression model.

11. The method of claim 7, further including applying a Hanning window to the overlapped window periods.

12. The method of claim 11, further including retaining only the power spectral densities in a frequency range of between about 0 hertz and 50 hertz.

13. A control system for a machine, comprising:
a memory; and
a processor to:
identify an acceleration signal at a controller onboard the machine;
partition the acceleration signal into overlapped window periods;
transform the acceleration signal of each overlapped window period into a power respective spectral density; and
pass the power spectral densities through a strain power spectral densities prediction model to generate predicted strain power spectral densities of a machine light structure,
wherein the strain power spectral densities prediction model includes a regression model; and
generate a notification responsive to the predicted strain power spectral densities,
wherein information based on the predicted strain power spectral densities is used to optimize the machine by one or more of:
adding strength to the machine light structure, or
reducing weight from the machine light structure.

14. The control system of claim 13, wherein the strain power spectral densities prediction model is based on shake table acceleration time history data and strain gauge time history data.

15. The control system of claim 14, wherein the shake table acceleration time history data is partitioned into the overlapped window periods and each overlapped window period is transformed into the respective power spectral density.

16. The control system of claim 14,
wherein the shake table acceleration time history data and strain gauge time history data are fit into a random forest regression model, and
wherein the regression model is the random forest regression model.

17. The control system of claim 13, wherein the processor is further to:
apply a Hanning window to the overlapped window periods.

18. The control system of claim 13, wherein the processor is further to:
provide the notification for display on a display in an operator control station.

19. The control system of claim 13, wherein the machine light structure includes a component that is primarily loaded by g-loading, vibration, or operator interaction.

20. The control system of claim 13, wherein the processor is further to:

provide the notification when the predicted strain power spectral densities are outside or over a particular range.

\* \* \* \* \*